(12) United States Patent
Chu et al.

(10) Patent No.: US 11,346,266 B2
(45) Date of Patent: May 31, 2022

(54) ENGINE EXHAUST AFTERTREATMENT DEVICE AND METHOD

(71) Applicant: WEICHAI POWER CO., LTD., Shandong (CN)

(72) Inventors: Guoliang Chu, Weifang (CN); Haihao Feng, Weifang (CN); Dong Qiu, Weifang (CN); Youqiang Xiao, Weifang (CN); Xinzheng Wang, Weifang (CN)

(73) Assignee: WEICHAI POWER CO., LTD., Weifang (CN)

( * ) Notice: Subject to any disclaimer, the term of this patent is extended or adjusted under 35 U.S.C. 154(b) by 0 days.

(21) Appl. No.: 17/287,935

(22) PCT Filed: Dec. 14, 2018

(86) PCT No.: PCT/CN2018/121080
§ 371 (c)(1),
(2) Date: Apr. 22, 2021

(87) PCT Pub. No.: WO2020/118654
PCT Pub. Date: Jun. 18, 2020

(65) Prior Publication Data
US 2021/0310395 A1  Oct. 7, 2021

(51) Int. Cl.
*F01N 3/20* (2006.01)
*F01N 3/035* (2006.01)

(52) U.S. Cl.
CPC .......... *F01N 3/2053* (2013.01); *F01N 3/035* (2013.01); *F01N 3/2066* (2013.01);
(Continued)

(58) Field of Classification Search
CPC combination set(s) only.
See application file for complete search history.

(56) References Cited

U.S. PATENT DOCUMENTS

| 8,230,843 B2 * | 7/2012 | Kurtz | F02M 26/06 123/568.12 |
| 10,487,756 B2 * | 11/2019 | Kemmerling | F02D 41/3035 |

(Continued)

FOREIGN PATENT DOCUMENTS

| CN | 202073649 U | 12/2011 |
| CN | 102365433 A | 2/2012 |

(Continued)

OTHER PUBLICATIONS

PCT International Search Report and Written Opinion, PCT/CN2018/121080, dated Sep. 16, 2019, 12 pgs.

*Primary Examiner* — Binh Q Tran
(74) *Attorney, Agent, or Firm* — Fenwick & West LLP

(57) ABSTRACT

An engine exhaust aftertreatment device includes a first exhaust treatment unit and/or a second exhaust treatment unit; the first exhaust treatment unit includes a first bypass pipeline and a first connection pipe provided between a DPF and an SCR; the second exhaust treatment unit comprises a second bypass pipeline and a second connection pipeline provided between a DOC and the DPF, one end of the second bypass pipeline being in communication with the turbine front exhaust pipe, and the other end of the second bypass pipeline being in communication with the second connection pipeline; when it is detected that an engine satisfies a starting condition of the first exhaust treatment unit, the first exhaust treatment unit starts; and when it is detected that the engine satisfies a starting condition of the second exhaust treatment unit, the second exhaust treatment unit starts.

19 Claims, 2 Drawing Sheets

(52) U.S. Cl.
CPC .... *F01N 2250/02* (2013.01); *F01N 2560/026* (2013.01); *F01N 2560/06* (2013.01); *F01N 2570/12* (2013.01); *F01N 2610/02* (2013.01); *F01N 2610/1453* (2013.01); *F01N 2900/0408* (2013.01); *F01N 2900/08* (2013.01); *F01N 2900/1402* (2013.01); *F01N 2900/1602* (2013.01)

(56) References Cited

U.S. PATENT DOCUMENTS

| | | |
|---|---|---|
| 2011/0146269 A1 | 6/2011 | Hepburn et al. |
| 2011/0283681 A1 | 11/2011 | Doring |
| 2013/0118162 A1* | 5/2013 | Hepburn ................. F01N 3/021 60/274 |
| 2014/0041367 A1* | 2/2014 | Balthes ................. F02M 26/05 60/274 |
| 2014/0223902 A1 | 8/2014 | Yacoub |
| 2015/0023854 A1 | 1/2015 | Lim et al. |
| 2016/0084182 A1* | 3/2016 | Ancimer ................. F01N 3/023 60/285 |
| 2019/0078478 A1* | 3/2019 | Martin ................... F02M 26/15 |
| 2019/0218986 A1* | 7/2019 | Yamaguchi ......... F02D 41/1448 |
| 2019/0234349 A1* | 8/2019 | Ulrey ..................... F02B 37/18 |

FOREIGN PATENT DOCUMENTS

| | | |
|---|---|---|
| CN | 103982279 A | 8/2014 |
| CN | 104081015 A | 10/2014 |
| WO | WO 2013/116051 A1 | 8/2013 |

* cited by examiner

ENGINE EXHAUST AFTERTREATMENT DEVICE AND METHOD

The present application is a 35 U.S.C. 371 Patent Application of PCT Application No. PCT/CN2018/121080, filed on Dec. 14, 2018, which is incorporated herein by reference in its entirety.

FIELD

The present disclosure relates to the technical field of engines, and in particular to an engine exhaust aftertreatment device and a method thereof.

BACKGROUND

At present, due to the requirements of emissions, an aftertreatment device is required to be installed. Through a supported catalyst inside the aftertreatment device, the emissions are converted. The exhaust treatment process of the aftertreatment device is generally treated successively through DOC-DPF-SCR before emission.

The DOC (Diesel Oxidation Catalyst): also known as oxidation catalytic technology, is a device that converts carbon monoxide (CO) and hydrocarbons (HC) in engine exhaust into harmless water ($H_2O$) and carbon dioxide ($CO_2$). The DOC is mainly coated with precious metals such as platinum and palladium, and the main function of the DOC in emission treatment with Euro VI/China VI regulation is to oxidize nitric oxide (NO) in exhaust gas to nitrogen dioxide ($NO_2$), and accelerates the conversion rate and efficiency of nitrogen oxides ($NO_x$) in a subsequent SCR (selective catalytic reduction), and increases the temperature of fuel injected during the regeneration of an oxidized DPF, so as to prepare for the regeneration of the DPF.

The DPF (Diesel Particulate Filter) relies on alternately blocking an inlet and outlet of a carrier hole of a filter to force airflow through a porous wall to achieve the trapping of particles. Generally speaking, the trapping efficiency is over 90%, effectively reducing the emission of pollutants such as PM2.5 in the exhaust gas. In a case that too much ash is trapped, fuel injection is required for the regeneration of the DPF.

Active regeneration: also known as the injection of diesel fuel in the aftertreatment, is that $O_2$ reacts with the diesel fuel in the DOC to increase an internal temperature of the DPF, which burns off carbon particles in the DPF by using high temperature.

Passive regeneration: the carbon particles in the DPF react with $NO_2$, which achieves the purpose of removing the carbon particles inside the DPF. The reaction process is: $C+2NO_2 \rightarrow CO_2+2NO$.

Thermal management: refers to the use of some control means to increase the temperature of after exhaust and the exhaust entering an interior of the aftertreatment of the engine.

SCR reaction: refers to spraying a urea solution into SCR, and $NH_3$ reacts with $NO_x$ in the SCR to reduce the concentration of $NO_x$ in the exhaust gas. After the temperature exceeds 200 degrees Celsius, the reaction has a relative high efficiency, and the higher the exhaust temperature with a certain range is, the higher the reaction efficiency is.

Urea injection temperature: refers to the minimum temperature required for urea to be completely hydrolyzed and converted efficiently in the SCR.

HC light-off temperature: refers to the minimum temperature required for the complete conversion of HC in the DOC and the DPF (the temperature is generally around 300 degrees Celsius).

The passive regeneration process, however, requires that the carbon particles inside the DPF be reacted by $NO_2$ at a relative high exhaust temperature in the exhaust gas. In operating conditions such as cold start or long time idling of the engine, the temperature of a carrier inside the aftertreatment is relative low, and has a low catalytic activity, the energy of the carrier to convert carbon particles is limited, and the efficiency of the passive regeneration is low. At the same time, if a regeneration request of the DPF is occurred, additional thermal management is required. Since the efficiency of the thermal management is poor, it is easy to cause deterioration of fuel consumption of the engine.

In addition, under operating conditions such as cold start or long time idling of the engine, the engine exhaust temperature is low, the internal carrier temperature of the aftertreatment is low, the catalytic activity is low, and the conversion efficiency of the urea in the SCR is low. If the engine is operated for a long time, it is easy to cause emissions of $NO_x$ to be high, too much unreacted urea accumulates in the SCR, and a great risk of crystallization is existed in the SCR, which causes the back pressure of the engine to increase and fuel consumption to deteriorate. At the same time, since the efficiency of the thermal management is poor, it is also easy to cause deterioration of fuel consumption of the engine.

Therefore, an existing engine exhaust aftertreatment system generally suffers from low exhaust treatment efficiency and is prone to exhaust excessive emissions.

In summary, the technical problems sought to be solved by those skilled in the art presently are low exhaust treatment efficiency and exhaust excessive emissions.

SUMMARY

An engine exhaust aftertreatment device and method thereof is provided according to embodiments of the present disclosure, which solves the problem of low exhaust treatment efficiency and exhaust excessive emissions of the engine exhaust aftertreatment device.

In view of this, the engine exhaust aftertreatment device according to the present disclosure includes a first exhaust treatment unit and/or a second exhaust treatment unit; the first exhaust treatment unit includes a first bypass pipeline, a first temperature sensor provided on a first connection pipeline and between a DPF and an SCR, a nitrogen oxygen sensor provided downstream of the SCR, and a first intelligent control valve provided on the first bypass pipeline; one end of the first bypass pipeline is in communication with a turbine front exhaust pipe of a turbocharger, and the other end of the first bypass pipeline is in communication with the first connection pipeline; the first temperature sensor, the nitrogen oxygen sensor and the first intelligent control valve are respectively in communication with an ECU of a vehicle; if an engine is in a normal working state, the first intelligent control valve is in a normally closed state; if the engine is in an operating state, and a temperature detected by the first temperature sensor is lower than a first preset value, or if a nitrogen oxygen emission detected by the nitrogen oxygen sensor exceeds a second preset value, or if the engine is in a cold start, the ECU controls the first intelligent control valve to open; the second exhaust treatment unit includes a second bypass pipeline, a second temperature sensor provided on a second connection pipeline and between a DOC and the DPF, a carbon load detection device provided in the DPF, and a second intelligent control valve provided on the second bypass pipeline; one end of the second bypass pipeline is in communication with the turbine front exhaust pipe, and the other end of the second bypass pipeline is in communication with the second connection pipeline; the second temperature sensor, the carbon load detection device and the second intelligent control valve are respectively in communication with the ECU; if the engine is in a normal working state, the second intelligent control valve is in a normally closed state; if the engine is in an operating state, and a temperature detected by the second temperature sensor is lower than a third preset value, or if a carbon load detected by the carbon load detection device reaches a carbon load required by the regeneration request of the DPF, the ECU controls the second intelligent control valve to open.

Preferably, a first one-way valve is provided on the first bypass pipeline, and the first one-way valve only allows one-way communication from one end connected with the turbine front exhaust pipe to the other end connected with the first connection pipeline.

Preferably, a proportion integration differentiation (PID) closed loop is used to adjust the opening degree of the first intelligent control valve.

Preferably, a urea nozzle is further provided on the first connection pipeline for connecting a urea solution, and an intake temperature detection device is provided at an inlet of the engine.

Preferably, an HC nozzle is further provided on a turbine rear exhaust pipe of the turbocharger.

Preferably, a hydrogen oxygen sensor is further provided on the turbine rear exhaust pipe, and the hydrogen oxygen sensor is located between the HC nozzle and a turbine of the turbocharger.

Preferably, a second one-way valve is further provided on the second bypass pipeline, and the second one-way valve only allows one-way communication from one end connected with the turbine front exhaust pipe to the other end connected with the second connection pipeline.

Preferably, a PID closed loop is used to adjust the opening degree of the second intelligent control valve.

Compared with the introduction of the background technology, in the actual use of the above engine exhaust aftertreatment device, if the first intelligent control valve is included, if the engine is in the normal working state, the first intelligent control valve is in the normally closed state, and the exhaust gas passes through the turbocharger and then enters the DOC; if the temperature detected by the first temperature sensor is lower than the first preset value, or if the nitrogen oxygen emission detected by the nitrogen oxygen sensor exceeds the second preset value, or if the engine is in the cold start, it indicates the internal carrier of the aftertreatment has low temperature and poor catalytic activity. This kind of situation is particularly likely to occur under the conditions that the engine is in the cold start or idling for a long time. At this time, the first intelligent control valve is controlled by the ECU to open, so that the high-temperature exhaust gas of the turbine front exhaust pipe is directly introduced into the SCR through the first bypass pipeline, and the high-temperature exhaust gas of the turbine directly enters the SCR without passing through a supercharger, which increases the temperature of the exhaust gas, and quickly activates catalytic activity, reduces emissions and the risk of excessive unreacted urea accumulation in the SCR and internal crystallization of the SCR, improves the efficiency of active regeneration, the action efficiency of the SCR, and the efficiency of the engine. From another perspective, the SCR reaction does not require additional thermal management, which reduces the energy consumption caused by thermal management, thereby reducing the energy waste caused by thermal management in the aftertreatment, and improving the reaction efficiency of the SCR. Therefore, through the first exhaust treatment unit, the exhaust treatment efficiency of the engine exhaust aftertreatment device may be improved, and the risk of exhaust excessive emission is reduced to a certain extent.

If the second intelligent control valve is included, if the engine is in the normal working state, the second intelligent control valve is in the normally closed state, and the exhaust gas passes through the turbocharger and then enters the DOC; if the temperature detected by the second temperature sensor is lower than the third preset value (generally 250 degrees Celsius), or if the carbon load detected by the carbon load detection device reaches the carbon load required by the regeneration request of the DPF, which indicates the internal carrier of the aftertreatment has low temperature and poor catalytic activity. This kind of situation is particularly likely to occur when the engine is in the cold start or idling for a long time. At this time, the second intelligent control valve is controlled by the ECU to open, so that the high-temperature exhaust gas of the turbine front exhaust pipe is directly introduced into the DPF, and the high-temperature exhaust gas of the turbine directly enters the DPF without passing through a supercharger, which increases the temperature of the exhaust, and quickly activates catalytic activity, reduces emissions, and reduces the cumulative rate of carbon deposits inside the DPF and the frequency of active regeneration of the DPF, and improves the reliability of the aftertreatment. From another perspective, if a regeneration of the DPF is requested, there is no need to perform additional thermal management control, which reduces the energy consumption caused by thermal management, thereby reducing the energy waste caused by thermal management in the aftertreatment, and improving the efficiency of the passive regeneration of the DPF. Therefore, through the second exhaust treatment unit, the exhaust treatment efficiency of the engine exhaust aftertreatment device may be improved, and the risk of exhaust excessive emission is reduced to a certain extent.

In addition, an engine exhaust aftertreatment method is further provided according to the present disclosure, and specifically including the steps: detecting an operating mode and an operating condition information of an engine; if it is detected that the engine is in a normal working state, a first intelligent control valve being in a normally closed state; if it is detected that the engine is in an operating state, and a temperature detected by a first temperature sensor is lower than a first preset value, or if a nitrogen oxygen emission detected by a nitrogen oxygen sensor exceeds a second preset value, or if the engine is in a cold start, an ECU controlling the first intelligent control valve to open; if it is detected that the engine is in a normal working state, a second intelligent control valve is in a normally closed state; if it is detected that the engine is in an operating state, and a temperature detected by a second temperature sensor is lower than a third preset value, or if a carbon load detected by a carbon load detection device reaches a carbon load required by a regeneration request of a DPF, the ECU controlling the second intelligent control valve to open.

Since the above engine exhaust aftertreatment device is used by the above method, and the above engine exhaust aftertreatment device has the above technical effects, so the method using the above engine exhaust aftertreatment device also has corresponding technical effects, which will not be repeated here.

Figure 1:
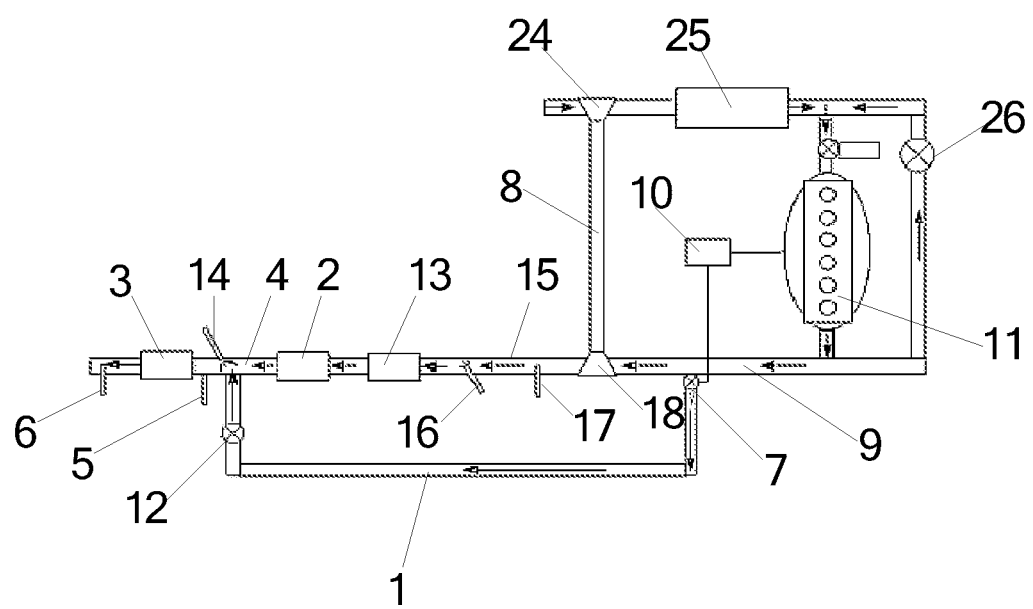
FIG. 1 is an arrangement structural schematic diagram of a first exhaust treatment unit of an engine exhaust aftertreatment device according to an embodiment of the present disclosure.
Figure 2:
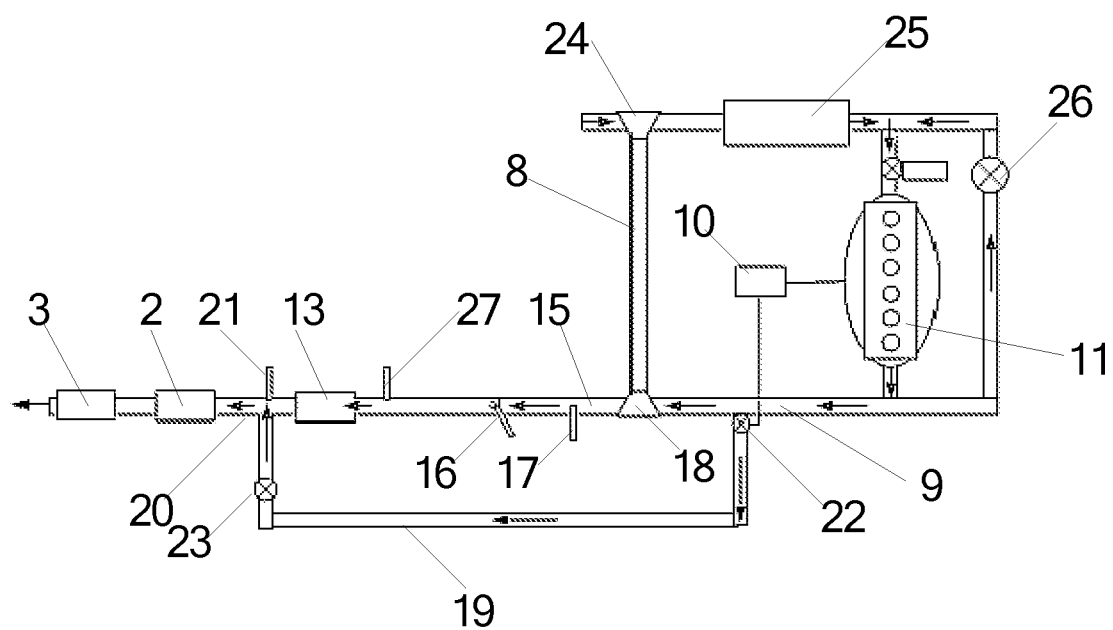
FIG. 2 is an arrangement structural schematic diagram of a second exhaust treatment unit of an engine exhaust aftertreatment device according to an embodiment of the present disclosure.

Reference numerals in FIGS. 1 and 2 are listed as follow:

| | |
|---|---|
| 1 first bypass pipeline, | 2 DPF, |
| 3 SCR, | 4 first connection pipeline, |
| 5 first temperature sensor, | 6 nitrogen oxygen sensor, |
| 7 first intelligent control valve, | 8 turbocharger, |
| 9 turbine front exhaust pipe, | 10 ECU, |
| 11 engine, | 12 first one-way valve, |
| 13 DOC, | 14 urea nozzle, |
| 15 turbine rear exhaust pipe, | 16 HC nozzle, |
| 17 hydrogen oxygen sensor, | 18 turbine, |
| 19 second bypass pipeline, | 20 second bypass pipeline, |
| 21 second temperature sensor, | 22 second intelligent control valve, |
| 23 second one-way valve, | 24 compressor, |
| 25 intercooler, | 26 EGR, |
| 27 third temperature sensor. | |

DETAILED DESCRIPTION OF THE EMBODIMENTS

The core of the present disclosure is to provide an engine exhaust aftertreatment device and method to solve the problem of low exhaust treatment efficiency and exhaust excessive emissions of the engine exhaust aftertreatment device.

In order to enable those skilled in the art to better understand the technical solution provided according to the present disclosure, the present disclosure will be further described in detail below with reference to the accompanying drawings and specific embodiments.

As shown in FIGS. 1 and 2, an engine exhaust aftertreatment device provided according to the present disclosure includes a first exhaust treatment unit and/or a second exhaust treatment unit; the first exhaust treatment unit includes a first bypass pipeline 1, a first temperature sensor 5 provided on a first connection pipeline 4 between a DPF 2 and an SCR 3, a nitrogen oxygen sensor 6 provided downstream of the SCR 3, and a first intelligent control valve 7 provided on the first bypass pipeline 1; one end of the first bypass pipeline 1 is in communication with a turbine front exhaust pipe 9 of a turbocharger 8, and the other end of the first bypass pipeline 1 is in communication with the first connection pipeline 4; the first temperature sensor 5, the nitrogen oxygen sensor 6 and the first intelligent control valve 7 are respectively in communication with an ECU 10 of a vehicle; if an engine 11 is in a normal working state, the first intelligent control valve 7 is in a normally closed state; if the engine 11 is in an operating state, and a temperature detected by the first temperature sensor 5 is lower than a first preset value, or if a nitrogen oxygen emission detected by the nitrogen oxygen sensor 6 exceeds a second preset value, or if the engine 11 is in a cold start, the ECU 10 controls the first intelligent control valve 7 to open; the second exhaust treatment unit includes a second bypass pipeline 19, a second temperature sensor 21 provided on a second connection pipeline 20 between a DOC 13 and the DPF 2, a carbon load detection device provided in the DPF 2, and a second intelligent control valve 22 provided on the second bypass pipeline 20; one end of the second bypass pipeline 19 is in communication with the turbine front exhaust pipe 9, and the other end of the second bypass pipeline 19 is in communication with the second connection pipeline 20; the second temperature sensor 21, the carbon load detection device and the second intelligent control valve 22 are respectively in communication with the ECU 10; if the engine 11 is in a normal working state, the second intelligent control valve 22 is in a normally closed state; if the engine 11 is in an operating state, a temperature detected by the second temperature sensor 21 is lower than a third preset value, or if a carbon load detected by the carbon load detection device reaches a carbon load required by a regeneration request of the DPF, the ECU 10 controls the second intelligent control valve 22 to open.

In the actual use of the above engine exhaust aftertreatment device, if the first intelligent control valve is included, and if the engine is in the normal working state, the first intelligent control valve is in the normally closed state, and the exhaust gas passes through the turbocharger and then enters the DOC; if the temperature detected by the first temperature sensor is lower than the first preset value, or if the nitrogen oxygen emission detected by the nitrogen oxygen sensor exceeds the second preset value, or if the engine is in the cold start, it indicates the internal carrier of the aftertreatment has low temperature and poor catalytic activity. This kind of situation is particularly likely to occur when the engine is in the cold start or idling for a long time. At this time, the first intelligent control valve is controlled by the ECU to open, so that the high-temperature exhaust gas of the turbine front exhaust pipe is directly introduced into the SCR through the first bypass pipeline, and the high-temperature exhaust gas of the turbine directly enters the SCR without passing through a supercharger, which increases the temperature of the exhaust gas, and quickly activates catalytic activity, reduces emissions and the risk of excessive unreacted urea accumulation in the SCR and internal crystallization of the SCR, improves the efficiency of active regeneration, the action efficiency of the SCR, and the efficiency of the engine. From another perspective, the SCR reaction does not require additional thermal management, which reduces the energy consumption caused by thermal management, thereby reducing the energy waste caused by thermal management in the aftertreatment, and improving the reaction efficiency of the SCR. Therefore, through the first exhaust treatment unit, the exhaust treatment efficiency of the engine exhaust aftertreatment device may be improved, and the risk of exhaust excessive emission is reduced to a certain extent.

If the second intelligent control valve is included, and if the engine is in the normal working state, the second intelligent control valve is in the normally closed state, and the exhaust gas passes through the turbocharger and enters the DOC; if the temperature detected by the second temperature sensor is lower than the third preset value (generally 250 degrees Celsius), or if the carbon load detected by the carbon load detection device reaches the carbon load required by the regeneration request of the DPF, it indicates the internal carrier of the aftertreatment has low temperature and poor catalytic activity. This kind of situation is particularly likely to occur when the engine is in the cold start or idling for a long time. At this time, the second intelligent control valve is controlled by the ECU to open, so that the high-temperature exhaust gas of the turbine front exhaust pipe is directly introduced into the DPF, and the high-temperature exhaust gas of the turbine directly enters the DPF without passing through the supercharger, which increases the temperature of the exhaust, and quickly activates catalytic activity, reduces emissions, and reduces the cumulative rate of carbon deposits inside the DPF and the frequency of active regeneration of the DPF, and improves the reliability of the aftertreatment. From another perspective, if a regeneration of the DPF is requested, there is no need to perform additional thermal management control, which reduces the energy consumption caused by thermal management, thereby reducing the energy waste caused by thermal management in the aftertreatment, and improving the efficiency of the passive regeneration of the DPF. Therefore, through the second exhaust treatment unit, the exhaust treatment efficiency of the engine exhaust aftertreatment device is improved, and the risk of exhaust excessive emission is reduced to a certain extent.

It should be noted that, the above first exhaust treatment unit and the second exhaust treatment unit may be chosen to arrange only one in the engine exhaust treatment device, or the first exhaust treatment unit and the second exhaust treatment unit may be provided at the same time. In practice application, the arrangement may be chosen according to actual needs. The conversion efficiency of the SCR may be improved through the first exhaust treatment unit, thereby improving the exhaust treatment efficiency of the exhaust aftertreatment device; the passive regeneration efficiency of the DPF may be improved through the second exhaust treatment unit, thereby improving the exhaust treatment efficiency of the exhaust aftertreatment device.

In some specific embodiments, in order to prevent the gas in the first connection pipeline from flowing back to the turbine front exhaust pipe through the first bypass pipeline, a first one-way valve 12 is provided on the first bypass pipeline 1, and the first one-way valve 12 only allows one-way communication from one end connected with the turbine front exhaust pipe 9 to the other end connected with the first connection pipeline 4.

In some specific embodiments, a PID closed loop is used to adjust the opening degree of the first intelligent control valve 7, so that the first intelligent control valve may correct the opening degree of the first intelligent control valve by calculating the size of the opening degree, which enables the first intelligent control valve to maintain an accurate opening degree.

It should be noted here that, generally speaking, a urea nozzle 14 is further provided on the first connection pipeline 4 for connecting a urea solution, and an intake temperature detection device is provided at an inlet of the engine 11. By detecting an intake temperature of the engine through the intake temperature detection device, it is determined that whether the intake temperature of the engine is higher or lower than the normal intake temperature may be determined. In a case that the intake temperature is relatively high or low, the combustion of the engine may be more unstable after the device for improving the conversion efficiency of the SCR provided by the disclosure is activated. Therefore, in a case that the relatively high or low intake temperature of the engine is detected, the above function is not activated, that is, the intelligent control valve is in a closed state.

In addition, an HC nozzle 16 is further provided on a turbine rear exhaust pipe 15 of the turbocharger 8. By arranging the HC nozzle, in a case that the passive regeneration fails, HC injection is triggered for active regeneration.

Moreover, a hydrogen oxygen sensor 17 is further provided on the turbine rear exhaust pipe 15, and the hydrogen oxygen sensor 17 is located between the HC nozzle 16 and a turbine 18 of the turbocharger 8. By arranging the hydrogen oxygen sensor, real-time rate calculation may be performed according to the concentration of $NO_x$ measured by the hydrogen oxygen sensor, so as to meet the needs of urea injection control and efficiency monitoring of the SCR.

In a further embodiment, in order to prevent the gas in the second connection pipeline from flowing back to the turbine front exhaust pipe through the second bypass pipeline due to an unstable pressure, a second one-way valve 23 is further provided on the second bypass pipeline 19, and the second one-way valve 23 only allows one-way communication from one end connected with the turbine front exhaust pipe 9 to the other end connected with the second connection pipeline 20.

Similarly, a PID closed loop is used to adjust the opening degree of the second intelligent control valve 22, so that the second intelligent control valve may correct the opening degree of the second intelligent control valve by calculating the size of the opening degree, which enables the second intelligent control valve to maintain an accurate opening degree.

In a further embodiment, a third temperature sensor 27 for detecting an intake temperature of the DOC is further provided at an inlet of the DOC 13. By detecting the intake temperature of the DOC, the reaction rate of the SCR may be determined in an auxiliary manner by detecting the temperature upstream of the DOC, because the reaction rate of the SCR is greatly affected by the temperature upstream of the DOC.

It should be noted here that, those skilled in the art should be able to understand that ECU is an abbreviation for electronic control unit in a vehicle. For the intake and exhaust system of the engine, ECU should further include an intercooler 25 and an EGR 26, in which the EGR is a cooler, the SCR is a device for reducing the concentration of $NO_x$ in the exhaust gas by spraying urea solution in the engine exhaust aftertreatment device; in addition, the turbocharge 8 should include a turbine 18 and a compressor 24.

In addition, an engine exhaust aftertreatment method is further provided according to the present disclosure, the engine exhaust aftertreatment device described in any one of the above solutions is used by the method, and the method specifically including the steps: detecting an operating mode and an operating condition information of an engine; if it is detected that the engine is in a normal working state, a first intelligent control valve is in a normally closed state; if it is detected that the engine is in an operating state, and a temperature detected by a first temperature sensor is lower than a first preset value, or if a nitrogen oxygen emission detected by a nitrogen oxygen sensor exceeds a second preset value, or if the engine is in a cold start, an ECU controls the first intelligent control valve to open; if it is detected that the engine is in a normal working state, a second intelligent control valve is in a normally closed state; if it is detected that the engine is in an operating state, and a temperature detected by a second temperature sensor is lower than a third preset value, or if a carbon load detected by a carbon load detection device reaches a carbon load required by a regeneration request of a DPF, the ECU controls the second intelligent control valve to open It should be noted that, those skilled in the art should know the way of detecting whether the engine is in a cold start, which may be known through the start time and start temperature.

Since the above engine exhaust aftertreatment device is used by the above method, and the above engine exhaust aftertreatment device has the above technical effects, so the method using the above engine exhaust aftertreatment device also has corresponding technical effects, which will not be repeated here.

The engine exhaust treatment device and method provided according to the present disclosure are described in detail above. It should be noted that, the above embodiments are described in a progressive manner. Each of the embodiments is mainly focused on describing its differences from other embodiments, and reference may be made among these embodiments with respect to the same or similar parts.

It should be noted that, in this article, terms such as "including", "comprising" or any other variations thereof are intended to cover non-exclusive inclusion, so that an item or device including a series of elements not only includes other elements that are not explicitly listed, or elements inherent to the item or device. If there are no more restrictions, the element defined by the sentence "including a . . ." does not exclude the existence of other same elements in the item or device that includes the above elements.

Specific examples are used in this article to illustrate the principle and implementation of the present disclosure, and the description of the above embodiments is only used to help understand the core idea of the present disclosure. It should be noted that, for those skilled of ordinary skill in the art, without departing from the principle of the present disclosure, several improvements and modifications can be made to the present disclosure, and these improvements and modifications also fall within the protection scope of the claims of the present disclosure.

The invention claimed is:

1. An engine exhaust aftertreatment device, comprising a first exhaust treatment unit and/or a second exhaust treatment unit;
   wherein the first exhaust treatment unit comprises a first bypass pipeline, a first temperature sensor provided on a first connection pipeline and between a diesel particulate filter (DPF) and a selective catalytic reduction (SCR), a nitrogen oxygen sensor provided downstream of the SCR, and a first intelligent control valve provided on the first bypass pipeline;
   one end of the first bypass pipeline is in communication with a turbine front exhaust pipe of a turbocharger, and another end of the first bypass pipeline is in communication with the first connection pipeline;
   the first temperature sensor, the nitrogen oxygen sensor and the first intelligent control valve are respectively in communication with an electronic control unit (ECU) of a vehicle;
   if an engine is in a normal working state, the first intelligent control valve is in a normally closed state; if the engine is in an operating state, and a temperature detected by the first temperature sensor is lower than a first preset value, or if a nitrogen oxygen emission detected by the nitrogen oxygen sensor exceeds a second preset value, or if the engine is in a cold start, the ECU controls the first intelligent control valve to open;
   the second exhaust treatment unit comprises a second bypass pipeline, a second temperature sensor provided on a second connection pipeline and between a diesel oxidation catalyst (DOC) and the DPF, a carbon load detection device provided in the DPF, and a second intelligent control valve provided on the second bypass pipeline;
   one end of the second bypass pipeline is in communication with the turbine front exhaust pipe, and the other end of the second bypass pipeline is in communication with the second connection pipeline;
   the second temperature sensor, the carbon load detection device and the second intelligent control valve are respectively in communication with the ECU;
   if the engine is in a normal working state, the second intelligent control valve is in a normally closed state; if the engine is in an operating state, and a temperature detected by the second temperature sensor is lower than a third preset value, or a carbon load detected by the carbon load detection device reaches a carbon load required by a regeneration request of the DPF, the ECU controls the second intelligent control valve to open.

2. The engine exhaust aftertreatment device according to claim 1, wherein a first one-way valve is provided on the first bypass pipeline, and the first one-way valve only allows one-way communication from one end connected with the turbine front exhaust pipe to the other end connected with the first connection pipeline.

3. The engine exhaust aftertreatment device according to claim 1, wherein a proportion integration differentiation (PID) closed loop is used to adjust an opening degree of the first intelligent control valve.

4. The engine exhaust aftertreatment device according to claim 1, wherein a urea nozzle is further provided on the first connection pipeline for connecting a urea solution, and an intake temperature detection device is provided at an inlet of the engine.

5. The engine exhaust aftertreatment device according to claim 1, wherein a hydrocarbon (HC) nozzle is further provided on a turbine rear exhaust pipe of the turbocharger.

6. The engine exhaust aftertreatment device according to claim 5, wherein a hydrogen oxygen sensor is further provided on the turbine rear exhaust pipe, and the hydrogen oxygen sensor is located between the HC nozzle and a turbine of the turbocharger.

7. The engine exhaust aftertreatment device according to claim 1, wherein a second one-way valve is further provided on the second bypass pipeline, and the second one-way valve only allows one-way communication from one end connected with the turbine front exhaust pipe to the other end connected with the second connection pipeline.

8. The engine exhaust aftertreatment device according to claim 1, wherein a proportion integration differentiation (PID) closed loop is used to adjust an opening degree of the second intelligent control valve.

9. An engine exhaust aftertreatment method using the engine exhaust aftertreatment device according to claim 1, specifically comprising:
   detecting an operating mode and an operating condition information of the engine;
   if it is detected that the engine is in the normal working state, the first intelligent control valve being in the normally closed state; if it is detected that the engine is in the operating state, and the temperature detected by the first temperature sensor is lower than the first preset value, or if the nitrogen oxygen emission detected by the nitrogen oxygen sensor exceeds the second preset value, or if the engine is in the cold start, the ECU controlling the first intelligent control valve to open;

if it is detected that the engine is in the normal working state, the second intelligent control valve being in the normally closed state; if it is detected that the engine is in the operating state, and the temperature detected by the second temperature sensor is lower than the third preset value, or if the carbon load detected by the carbon load detection device reaches the carbon load required by the regeneration request of the DPF, the ECU controlling the second intelligent control valve to open.

10. The engine exhaust aftertreatment device according to claim 2, wherein a second one-way valve is further provided on the second bypass pipeline, and the second one-way valve only allows one-way communication from one end connected with the turbine front exhaust pipe to the other end connected with the second connection pipeline.

11. The engine exhaust aftertreatment device according to claim 3, wherein a second one-way valve is further provided on the second bypass pipeline, and the second one-way valve only allows one-way communication from one end connected with the turbine front exhaust pipe to the other end connected with the second connection pipeline.

12. The engine exhaust aftertreatment device according to claim 4, wherein a second one-way valve is further provided on the second bypass pipeline, and the second one-way valve only allows one-way communication from one end connected with the turbine front exhaust pipe to the other end connected with the second connection pipeline.

13. The engine exhaust aftertreatment device according to claim 5, wherein a second one-way valve is further provided on the second bypass pipeline, and the second one-way valve only allows one-way communication from one end connected with the turbine front exhaust pipe to the other end connected with the second connection pipeline.

14. The engine exhaust aftertreatment device according to claim 6, wherein a second one-way valve is further provided on the second bypass pipeline, and the second one-way valve only allows one-way communication from one end connected with the turbine front exhaust pipe to the other end connected with the second connection pipeline.

15. The engine exhaust aftertreatment device according to claim 2, wherein a proportion integration differentiation (PID) closed loop is used to adjust an opening degree of the second intelligent control valve.

16. The engine exhaust aftertreatment device according to claim 3, wherein the PID closed loop is used to adjust an opening degree of the second intelligent control valve.

17. The engine exhaust aftertreatment device according to claim 4, wherein a proportion integration differentiation (PID) closed loop is used to adjust an opening degree of the second intelligent control valve.

18. The engine exhaust aftertreatment device according to claim 5, wherein a proportion integration differentiation (PID) closed loop is used to adjust an opening degree of the second intelligent control valve.

19. The engine exhaust aftertreatment device according to claim 6, wherein a proportion integration differentiation (PID) closed loop is used to adjust an opening degree of the second intelligent control valve.

* * * * *